United States Patent [19]
Saunders et al.

[11] Patent Number: 5,761,613
[45] Date of Patent: Jun. 2, 1998

[54] DIVERSITY RECEIVER

[75] Inventors: Simon R. Saunders, Bath; Richard W. Burton, Ely, both of England

[73] Assignee: U.S. Philips Corporation, New York, N.Y.

[21] Appl. No.: 564,887

[22] Filed: Nov. 29, 1995

[30] Foreign Application Priority Data

Dec. 2, 1994 [GB] United Kingdom .................. 9424341

[51] Int. Cl.$^6$ .................................................. H04B 7/08
[52] U.S. Cl. .................................... 455/137; 455/273
[58] Field of Search ........................... 455/137, 138, 455/139, 273, 306, 303; 375/347, 350, 232

[56] References Cited

U.S. PATENT DOCUMENTS

| | | | |
|---|---|---|---|
| 3,383,599 | 5/1968 | Miyagi | 455/137 |
| 4,715,048 | 12/1987 | Masamura | 375/347 |
| 4,849,990 | 7/1989 | Ikegami et al. | 375/347 |
| 5,031,193 | 7/1991 | Atkinson et al. | 455/138 |
| 5,335,251 | 8/1994 | Onishi et al. | 455/137 |
| 5,461,646 | 10/1995 | Anvari | 455/137 |
| 5,481,570 | 1/1996 | Winters | 455/137 |
| 5,504,786 | 4/1996 | Gardner | 455/137 |
| 5,553,102 | 9/1996 | Jasper et al. | 455/137 |

FOREIGN PATENT DOCUMENTS

| | | |
|---|---|---|
| 0477158 | 3/1992 | European Pat. Off. . |
| 0492851 | 7/1992 | European Pat. Off. . |
| 2259430 | 3/1993 | United Kingdom . |
| 9107829 | 5/1991 | WIPO . |

Primary Examiner—Amelia Au
Attorney, Agent, or Firm—Arthur G. Schaier

[57] ABSTRACT

A diversity receiver for receiving digital signals, particularly, but not exclusively, digital private mobile radio signals, comprises first and second reception branches (10, 12) which frequency down convert respective input signals to the zero IF signals which are digitized and combined in a maximal ratio combiner (22) and the result is applied to a digital demodulator (23). The first and second branches are asymmetrical with the first branch (10) being fully specified and the second branch (12) being deliberately degraded relative to the first branch (10).

6 Claims, 2 Drawing Sheets

DIVERSITY RECEIVER

BACKGROUND OF THE INVENTION

The present invention relates to a diversity receiver which has particular, but not exclusive, application to receiving DPMR (digital private mobile radio) signals. The receiver may be implemented as a mobile, transportable or portable receiver which may comprise a part of a transceiver.

Diversity reception in mobile/portable radio application has been shown to yield a range improvement of up to 60% and a great improved robustness in DPMR systems. Diversity reception provides a high performance alternative to using an equalizer to overcome intersymbol interference in DPMR systems such as TETRA (Trans European Trunked Radio) which is currently being designed by ETSI (European Telecommunications Standards Institute). However, the improvements are obtained at the expense of an extra antenna and receiving hardware.

Diversity is a method for transmitting or receiving the same signal over at least two independently fading channels (or branches). The chance of both branches being in a deep fade simultaneously is greatly reduced so that the system is much more reliable over the usual coverage area of the base station and is capable of working over considerably increased distances for a given threshold performance.

In the case of receiver diversity, the receiver generally comprises a fully specified receiver whose signal input is coupled by a change-over switch to one or other of two antennas.

For DPMR use, switching is only practical between bursts since the switching process introduces transients which would be particularly detrimental for a differential modulation scheme such as is proposed to be used in TETRA. Burst-by-burst switching, combined with a special prediction method to decide which branch is likely to be the best in the next received burst allows for simple portables with only the RF part in the receiver to do the switching at the antenna end. This approach is only practical at low speeds because the prediction algorithm cannot operate effectively at high speed.

An alternative arrangement is to have two fully specified receivers the outputs of which are combined in an appropriate network. As signal combining is difficult to do in the RF stages of the receivers since careful co-phasing is necessary, the signals are most easily combined in the base band signal processing which requires a complete duplication of the RF receiver hardware. To have two fully specified receivers is very expensive and will lead to quite a high power consumption which has an adverse effect on battery life.

SUMMARY OF THE INVENTION

An object of the present invention is to effect receiver diversity in an economic manner.

According one aspect of to the present invention there is provided a diversity receiver comprising at least two asymmetrically designed reception branches and combining means for combining weighted outputs of the reception branches, wherein one of the at least two reception branches is fully specified.

According to a second aspect of the present invention there is provided a transceiver comprising a transmitter and a diversity receiver, the diversity receiver comprising at least two asymmetrically designed reception branches and combining means for combining weighted outputs of the reception branches, wherein one of the at least two reception branches is fully specified.

It has been found that by having at least one branch not fully specified, that is having a poorer sensitivity and/or selectivity, then receiver diversity can be achieved at substantially lower cost both in terms of components and their complexity and also from the point of view of power consumption.

In an embodiment of the present invention a convenient form of combining the weighted outputs of the reception branches is what is termed maximal ratio combining. In maximal ratio combining the signals from the two branches are weighted in the ratio of their instantaneous signal to noise ratio before the signals are summed. This has been found to yield very good conditions for subsequent demodulation and is particularly simple to do in a DPMR receiver since it involves simply summing the branches after differential demodulation, which has to be performed anyway.

In an embodiment of the present invention the fully specified reception branch has additional RF filtering compared to the non-specified branch.

Additionally, the fully specified reception branch may have better IF filtering, that is better selectivity.

BRIEF DESCRIPTION OF THE DRAWINGS

The present invention will now be described by way of example with reference to the accompanying drawings, wherein.

In the drawings the same reference numerals have been used to indicate corresponding features.

DETAILED DESCRIPTION OF THE PREFERRED EMBODIMENTS

Figure 1:
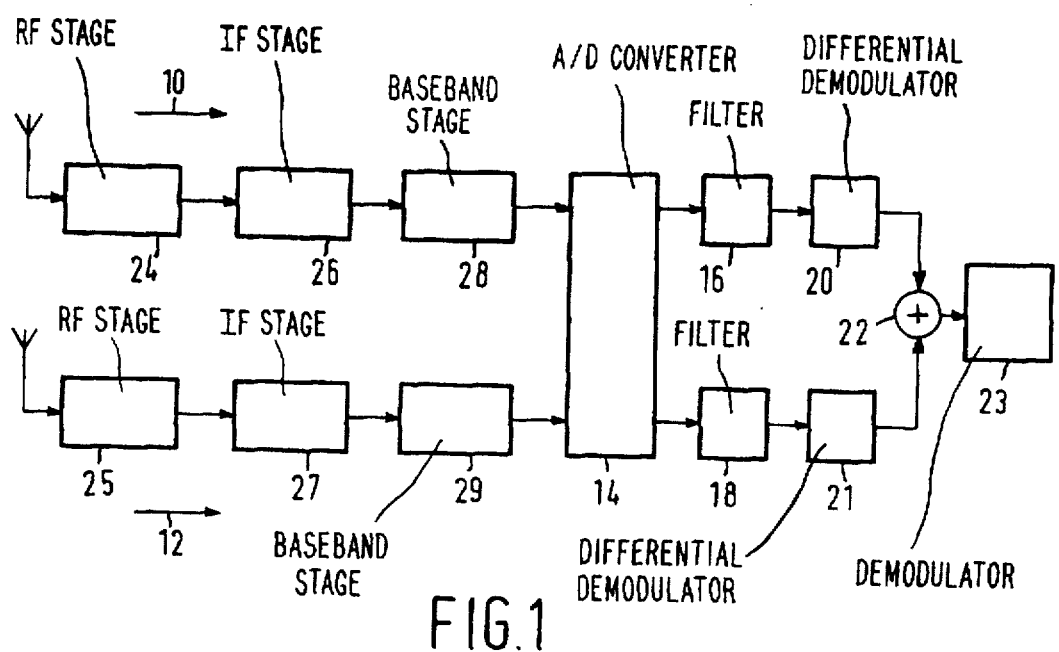
FIG. 1 is a block schematic diagram of an embodiment of the present invention.

The receiver shown in FIG. 1 comprises two analog reception branches 10,12, the outputs from which are applied to an analog to digital converter 14. Outputs of the analog to digital converter are connected to respective FIR filters 16,18 whose outputs are connected to differential demodulators 20,21 respectively. The outputs of the differential demodulators 20,21 are combined in a summation stage 22, the output of which is connected to a demodulator 23. All the demodulation is done with digital signals.

One of the reception branches, say the branch 10, is fully specified which means that it is made to conform to the specification issued by the system operator or in the radio standard which is being operated by the network. However, the other reception branch 12 is deliberately made to be inferior to the reception branch 10 in order to reduce its specification. One way of giving the receiver an inferior performance is to reduce the quality of the filters in the RF, IF and base band stages and also for the FIR filter 18 to have fewer taps for less selectivity. The digital part of the receiver effects maximal ratio combining in which the signals from the two branches are weighted in the ratio of their instantaneous signal to noise ratios before summing these signals. In FIG. 1 the two reception branches respectively comprise an RF stage 24,25, and IF stage 26,27 and base band stages 28,29.

Figure 2:
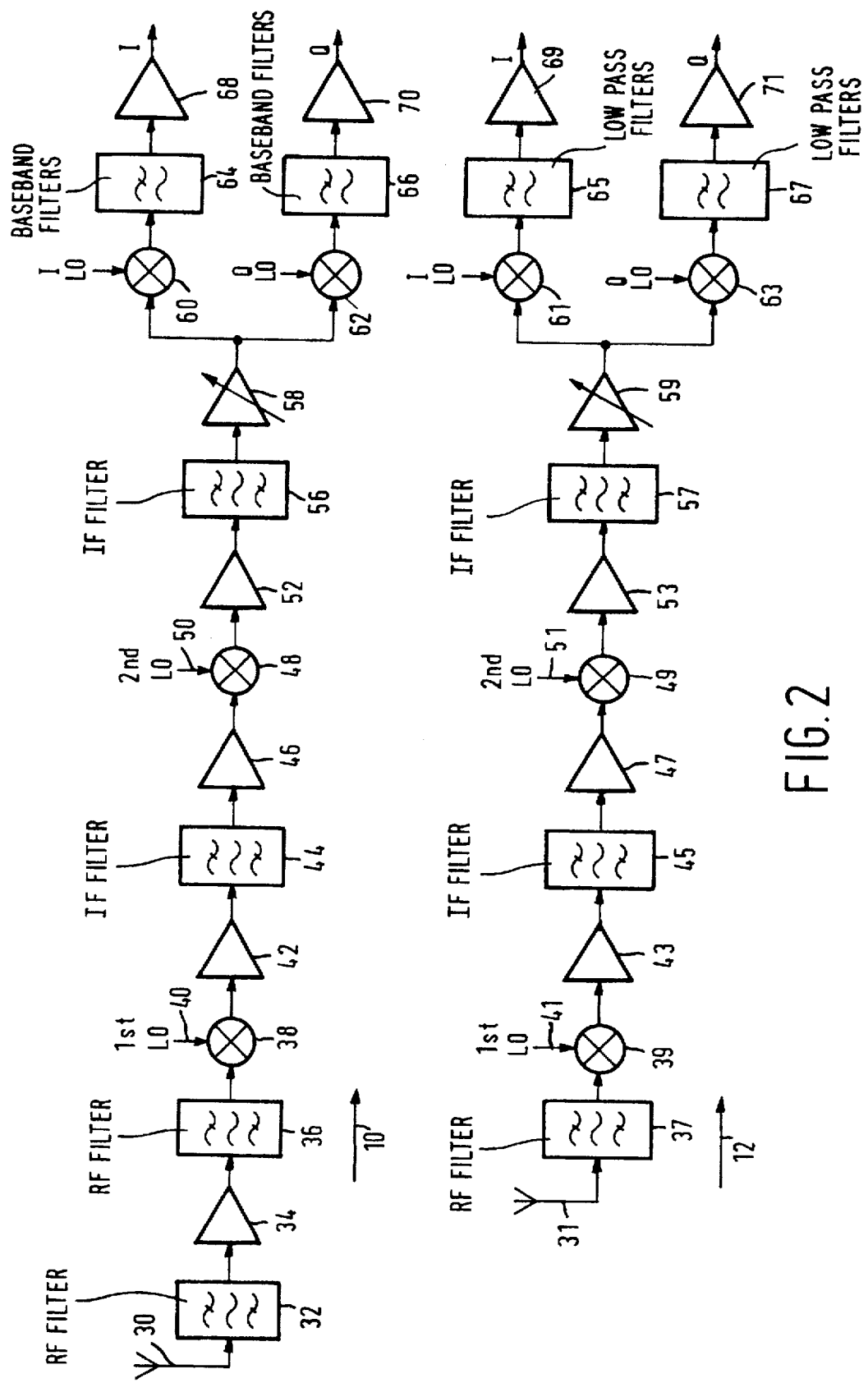
FIG. 2 is a block schematic diagram showing in greater detail the analog reception branches.

Referring to FIG. 2 the fully specified reception branch 10 comprises an antenna 30 connected to a first RF filter 32 which has an output connected to an RF amplifier 34. An output of this amplifier is connected to a second RF filter 36 the output of which is connected to a first input of a first mixer 38 which has a second input 40 for a first local oscillator frequency. An output of the first mixer 38 is connected to a post-mixer amplifier 42 to the output of which is connected a first IF filter 44. An IF amplifier 46 is connected to the output of the IF filter 44 and has an output connected to a first input of a second mixer 48 which has a second input 50 for a second local oscillator signal. A post-mixer amplifier 52 is connected to the output of the mixer 48 and a second IF filter 56 is connected to an output of the amplifier 52. A variable gain amplifier 58 is connected to an output of the second IF filter 56. An output of the variable gain amplifier 58 is divided into two quadrature related paths comprising respectively mixers 60,62 whose outputs are connected to base band filters 64,66, the outputs of which are connected to amplifiers 68,70. Quadrature related In phase and Quadrature phase local oscillator signals are supplied to the mixers 60,62. The I and Q signals at the outputs of the amplifiers 68,70 are connected to the analog to digital converter 14 (FIG. 1).

The degraded reception branch 12 in many respects resembles the fully specified reception branch 10 but omits a first RF filter and an RF amplifier. An antenna 31 is connected to an RF filter 37 which in turn is connected to a first input of a first mixer 39 which has a second input 41 for a first local oscillator signal. A post-mixer amplifier 43 is connected to the output of the mixer 39 and has an output connected to a first IF filter 45. Compared to the IF filter 44 in the branch 10, the filter 45 is degraded, that is, it has a poorer selectivity. An IF amplifier 47 has an input connected to an output of the filter 45 and an output connected to a first input of a second local oscillator 49 which has a second input 51 for a second local oscillator signal. A post-mixer amplifier 53 has an input connected to an output of the mixer 49 and an output connected to a second IF filter 57. A variable gain amplifier 59 has an input connected to the output of the filter 57 and an output which is split into quadrature related signal paths comprising respectively mixers 61,63, low pass filters 65,67 connected to the output of their respective mixers and amplifiers 69,71 connected to the output of their respective low pass filters. The I and Q outputs of the amplifiers 69,71 are connected to the analog to digital converter 14 (FIG. 1). Quadrature related local oscillator signals are applied to the mixers 61,63. In the case of the mixers 60, 62, 61 and 63 the local oscillator frequencies mix the signals down to a zero IF.

Figure 3:
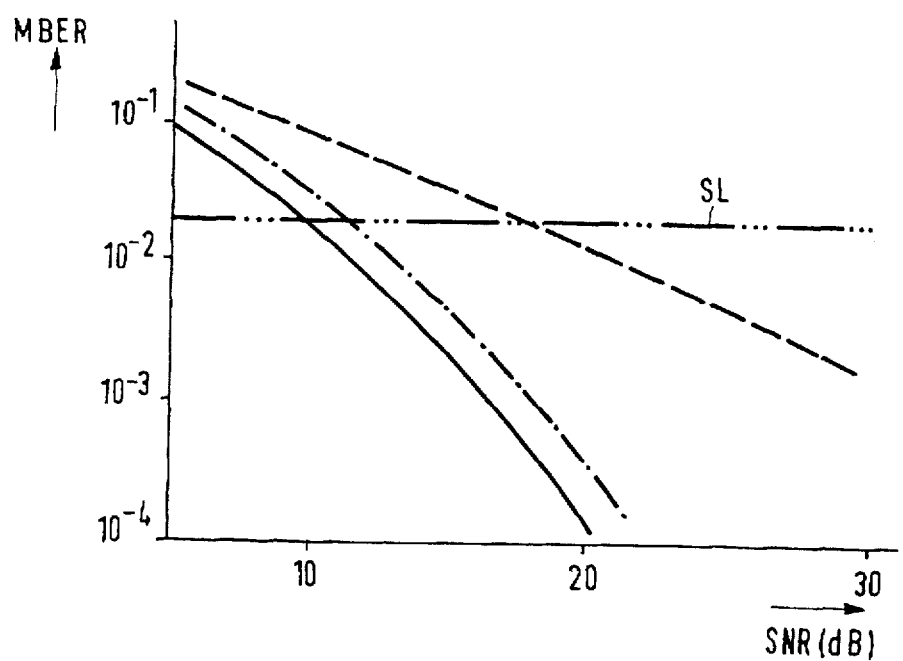
FIG. 3 is a graph in which the performance of a receiver made in accordance with the present invention (chain-dot line) is compared with a diversity receiver comprising two fully specified branches (continuous line) and a receiver having no diversity (broken lines), all at 50 km/h.

Referring to FIG. 3 which is a graph of branch signal to noise ratio (SNR) on the abscissa and mean bit error rate (MBER) on the ordinate, the performance of a receiver with no diversity is shown in broken lines, of a diversity receiver with two fully specified reception branches is shown in a full line and of a diversity receiver with one branch fully specified and a second branch degraded by 3 dBs is shown in chain dot lines. The horizontal line marked SL indicates a specified sensitivity limit and the intersection of this line with the various curves illustrates that compared to the fully specified receiver an 8 dB of gain is available by using diversity and that by degrading one receiver branch by 3 dBs, 6 dBs of gain is obtained. In view of the cost saving in components, bulk and current consumption, the loss of 2 dB of gain compared to having two fully specified reception branches is worthwhile. Furthermore this increase in gain means that the diversity receiver can operate acceptably over a greater range, an increase by a factor of up to 1.6 thereby increasing the coverage area by a factor of up to 2.5.

The lowest limit of degradation of the second reception branch 12 would be that if no benefits were gained compared to the no diversity arrangement.

From reading the present disclosure, other modifications will be apparent to persons skilled in the art. Such modifications may involve other features which are already known in the design, manufacture and use of diversity receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

We claim:

1. A diversity receiver comprising at least two reception branches with one of the at least two reception branches being implemented to a higher specification than another of said at least two reception branches and wherein each of said reception branches comprise an analog section having frequency down-conversion means, said diversity receiver comprising:

digitizing means for digitizing the signals from each of said frequency down-conversion means;

differential demodulation means for demodulating the digitized signals; and maximal ratio combining means coupled to said differential demodulation means for combining weighted outputs of the reception branches and for deriving an output signal.

2. The diversity receiver as claimed in claim 1, wherein each of the reception branches comprises an analog section in which an input signal is converted to quadrature related IF signals, and said digitizing means digitizes said quadrature related IF signals.

3. The diversity receiver as claimed in claim 2, wherein one reception branch has additional RF filtering that is not in any of said other reception branches.

4. The diversity receiver as claimed in claim 3, wherein each analog section has first and second IF stages, respective IF filtering means being provided between each first and second IF stages, the selectivity of the IF filtering means in one receptive branch is better than that of the IF filtering means in each of said other receptive branches.

5. The diversity receiver as claimed in claim 4, further comprising FIR filters coupled to outputs of the analog to digital conversion means, the FIR filter in the specified branch having a greater number of taps than that in the non-specified branch.

6. A transceiver comprising a transmitter and a diversity receiver, the diversity receiver comprising at least two reception branches with one of the at least two reception branches being implemented to a higher specification than another of said at least two reception branches and wherein each of said reception branches comprise an analog section having frequency down-conversion means, and wherein said diversity receiver further comprises digitizing means for digitizing the signals from each of said frequency down-conversion means; differential demodulation means for demodulating the digitized signals; and maximal ratio combining means coupled to said differential demodulation means for combining weighted outputs of the reception branches and for deriving an output signal.

* * * * *